US011172376B2

(12) United States Patent
Sha et al.

(10) Patent No.: US 11,172,376 B2
(45) Date of Patent: Nov. 9, 2021

(54) METHOD AND APPARATUS FOR SELECTING AND ACCESSING NETWORK, AND COMPUTER STORAGE MEDIUM

(71) Applicant: ZTE Corporation, Guangdong (CN)

(72) Inventors: Xiubin Sha, Guangdong (CN); Bo Dai, Guangdong (CN); Ting Lu, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/403,494

(22) Filed: May 3, 2019

(65) Prior Publication Data
US 2019/0380045 A1 Dec. 12, 2019

Related U.S. Application Data

(63) Continuation of application No. PCT/CN2017/109478, filed on Nov. 6, 2017.

(30) Foreign Application Priority Data

Nov. 4, 2016 (CN) .......................... 201610962458.4

(51) Int. Cl.
H04B 17/318 (2015.01)
H04W 16/26 (2009.01)
(Continued)

(52) U.S. Cl.
CPC ............ H04W 16/26 (2013.01); H04W 8/08 (2013.01); H04W 12/06 (2013.01); H04W 36/08 (2013.01);
(Continued)

(58) Field of Classification Search
None
See application file for complete search history.

(56) References Cited

U.S. PATENT DOCUMENTS 10,470,089 B2* 11/2019 Lee .................. H04W 36/0088
10,631,330 B2* 4/2020 Vajapeyam .............. H04L 5/14
(Continued)

FOREIGN PATENT DOCUMENTS

CN 104619025 A 5/2015
CN 105101044 A 11/2015
(Continued)

OTHER PUBLICATIONS

Chinese Office Action dated Feb. 3, 2020 for Chinese Patent Application No. 201610962458.4, filed on Nov. 4, 2016 (15 pages).
(Continued)

Primary Examiner — Sithu Ko
(74) Attorney, Agent, or Firm — Perkins Coie LLP

(57) ABSTRACT

Disclosed are methods and devices for selecting and accessing a network. In an example, a method includes broadcasting, by a base station, access parameter information, where the access parameter information comprises an offset of a coverage enhancement (CE) level reference signal received power (RSRP) threshold of a cell relative to a minimum reception level threshold for decision of cell residence, and is used for enabling a user equipment (UE) without authorization of CE to determine whether the UE is able to use a network resource of a target cell.

21 Claims, 8 Drawing Sheets

(51) Int. Cl.
*H04W 8/08* (2009.01)
*H04W 12/06* (2021.01)
*H04W 36/08* (2009.01)
*H04W 68/00* (2009.01)
*H04W 74/08* (2009.01)

(52) U.S. Cl.
CPC ..... *H04W 68/005* (2013.01); *H04W 74/0833* (2013.01)

(56) References Cited

U.S. PATENT DOCUMENTS

| | | | |
|---|---|---|---|
| 2013/0083749 | A1 | 4/2013 | Xu et al. |
| 2015/0016312 | A1 | 1/2015 | Li et al. |
| 2016/0337931 | A1* | 11/2016 | Wang ................ H04W 72/0473 |
| 2017/0238302 | A1* | 8/2017 | Futaki ..................... H04W 4/70 370/329 |
| 2017/0303204 | A1* | 10/2017 | Hu ......................... H04W 52/06 |
| 2017/0338877 | A1* | 11/2017 | Yum ......................... H04B 7/04 |
| 2017/0374574 | A1* | 12/2017 | Lee ......................... H04W 24/08 |
| 2018/0063722 | A1* | 3/2018 | Lee ......................... H04W 48/12 |
| 2018/0176847 | A1* | 6/2018 | Fasil Abdul .......... H04J 11/0093 |
| 2018/0302880 | A1* | 10/2018 | Yu ......................... H04W 64/006 |
| 2019/0174434 | A1* | 6/2019 | Koskinen ............. H04W 52/367 |
| 2019/0281633 | A1* | 9/2019 | Ahn ....................... H04W 52/36 |
| 2019/0380045 | A1* | 12/2019 | Sha ......................... H04W 36/08 |

FOREIGN PATENT DOCUMENTS

| | | |
|---|---|---|
| CN | 105517011 A | 4/2016 |
| CN | 105636156 A | 6/2016 |
| CN | 105722153 A | 6/2016 |
| EP | 3 091 786 A1 | 11/2016 |
| EP | 3 244 683 A1 | 11/2017 |
| WO | 2015/113275 A1 | 8/2015 |
| WO | 2016/111219 A1 | 7/2016 |
| WO | 2016/114149 A1 | 7/2016 |

OTHER PUBLICATIONS

Extended Search Report dated Oct. 5, 2020 for European Patent Application No. 17867110.3, filed on Nov. 6, 2017 (10 pages).
Ericsson, "Authorization of use of Coverage Enhancements," 3GPP TSG-RAN2 Meeting #95bis, R2-166564, Kaohsiung, Taiwan, 6 pages, Oct. 10, 2016.
Huawei et al. "Authorization of use of Coverage Enhancement functionality," 3GPP SA WG2 Meeting #116, S2-163565, Vienna, Austria, 6 pages, Jul. 11, 2016.
International Search Report and Written Opinion dated Jan. 26, 2018 for International Application No. PCT/CN2017/109478, filed on Nov. 6, 2017 (16 pages).

* cited by examiner

Broadcast, by a base station, access parameter information, where the access parameter information is used for enabling a UE without authorization of CE to determine whether the UE is able to use a network resource of a target cell ⸺ 101

FIG. 1

Receive, by the UE, access parameter information, where the access parameter information is used for enabling the UE to determine, when being without authorization of CE, whether the UE is able to use the network resource of the target cell ⸺ 201

FIG. 2

METHOD AND APPARATUS FOR SELECTING AND ACCESSING NETWORK, AND COMPUTER STORAGE MEDIUM

CROSS REFERENCE TO RELATED APPLICATIONS

This patent document is a continuation of and claims priority to International Patent Application No. PCT/CN2017/109478, filed on Nov. 6, 2017, which claims the benefit of priority of Chinese Patent Application No. 201610962458.4, filed on Nov. 4, 2016. The entire contents of the before-mentioned patent applications are incorporated by reference as part of the disclosure of this application.

TECHNICAL FIELD

The present disclosure generally relates to the field of wireless communications, and in particular, to a methods, systems and devices for network selection and access.

BACKGROUND

Machine-to-Machine (M2M) communication is an important subject for 5th generation (5G) mobile communication technology and is also an important application field for future wireless communications. In M2M communication, when a user equipment (UE) receives and/or sends data in a cell with poor coverage, improving the reception and/or transmission reliability of the UE may require repeated reception and/or transmission on a physical layer. In another aspect, the coverage of the network is also improved through the repeated reception and/or transmission on the physical layer, which is also referred to as coverage enhancement (CE).

The reception and transmission reliability of the UE in a coverage enhancement state is improved through the repeated reception and/or transmission on the physical layer. The repeated reception and/or transmission on the physical layer mean that the UE will occupy network resources twice. Therefore, the network operator expects to be able to authorize whether the UE can work in the coverage enhancement state and to perform differentiated charging.

The typical applications of the coverage enhancement include a narrowband-Internet of Things (NB-IoT) system, and an enhanced machine type communication (eMTC) system (or referred to as a bandwidth-reduced low-complexity UE and a UE in coverage enhancement). Whether the UE in such a system is in the coverage enhancement state and whether the repeated reception and/or transmission on the physical layer is required to improve the transmission and reception reliability are determined by a measurement value of reference signal received power (RSRP) where the UE is located and a radio coverage level RSRP. Generally, the RSRP threshold is configured to be multiple thresholds. When the radio quality measurement value is greater than or equal to the first RSRP threshold, the UE is considered to be in the coverage enhancement level 0; herein, the radio quality is good, and the repeated reception and/or transmission on the physical layer is not required. When the radio quality measurement value is smaller than the first RSRP threshold, and greater than or equal to the second RSRP threshold, the UE is considered to be in coverage enhancement level 1, wherein the radio quality is poor, and a some amount of the repeated reception and/or transmission on the physical layer is required. When the radio quality measurement value is smaller than the second RSRP threshold, the UE is considered to be in a higher radio coverage enhancement level; wherein the radio quality is even poorer, and a greater amount of the repeated reception and/or transmission on the physical layer is required. In the eMTC system, the coverage enhancement level 0 and the coverage enhancement level 1 are also referred to as a coverage enhancement mode A, and the coverage enhancement level 2 and the coverage enhancement level 3 are also referred to as a coverage enhancement mode B. The coverage enhancement mode A does not require or requires a small amount of the repeated reception and/or transmission on the physical layer. The coverage enhancement mode B requires a large amount of the repeated reception and/or transmission on the physical layer.

The current radio coverage level RSRP threshold is broadcasted by the eNodeB to the UE through a system information block (SIB) of a serving cell. After the UE resides in the serving cell, the coverage enhancement level is determined by comparing a radio quality RSRP measurement value of the location of the UE with the radio coverage level RSRP threshold, and a random access resource is selected according to the coverage enhancement level to initiate a random access procedure. The evolved NodeB (eNodeB) determines the radio coverage level of the UE based on the received resource of the random access procedure, and performs subsequent radio resource scheduling based on the radio coverage level. The eNodeB sends the radio coverage level of the UE to a mobility management entity (MME). The MME may send the latest radio coverage level information of the UE to the eNodeB through a paging message when the paging message is sent to the eNodeB. The eNodeB may send the paging message based on the received radio level information.

No effective solution has been provided to solve the problem of how to limit UEs without authorization of CE not to use coverage enhancement resources and how to send a CE-related Information Element (IE) after the coverage enhancement authorization function is introduced.

SUMMARY

To solve above-mentioned technical problem, embodiments of the present disclosure provide methods, systems and devices for network selection and access.

In one exemplary aspect, a method for network selection and access includes broadcasting, by a base station, access parameter information, where the access parameter information is used for enabling a user equipment (UE) without authorization of coverage enhancement (CE) to determine whether the UE is able to use a network resource of a target cell.

The method for selecting and accessing a network provided in an embodiment of the present disclosure includes:

receiving, by the UE, access parameter information, where the access parameter information is used for enabling the UE to determine, when being without authorization of CE, whether the UE is able to use the network resource of the target cell.

The method for selecting and accessing a network provided in an embodiment of the present disclosure includes:

determining, by a mobility management entity (MME), whether a UE is authorized with CE; and sending, by the MME, a paging message to a base station on the basis of whether the UE is authorized with CE.

The method for selecting and accessing a network provided in an embodiment of the present disclosure includes:

receiving, by a base station, a paging message sent by an MME; and for a UE without authorization of CE, paging, by the base station, the UE by using at least one of a resource in normal coverage or a resource of an authorized CE level.

An apparatus for selecting and accessing a network provided in an embodiment of the present disclosure is applied to a base station and includes a sending unit.

The sending unit is configured to broadcast access parameter information, where the access parameter information is used for enabling a UE without authorization of CE to determine whether the UE is able to use a network resource of a target cell.

An apparatus for selecting and accessing a network provided in an embodiment of the present disclosure is applied to a UE and includes a receiving unit.

The receiving unit is configured to receive access parameter information, where the access parameter information is used for enabling the UE to determine, when being without authorization of CE, whether the UE is able to use a network resource of a target cell.

An apparatus for selecting and accessing a network provided in an embodiment of the present disclosure is applied to an MME and includes a determining unit and a paging unit.

The determining unit is configured to determine whether a UE is authorized with CE.

The paging unit is configured to send a paging message to the base station on the basis of whether the UE is authorized with CE.

An apparatus for selecting and accessing a network provided in an embodiment of the present disclosure is applied to a base station and includes a receiving unit and a processing unit.

The receiving unit is configured to receive a paging message sent by the MME.

The processing unit is configured to, for a UE without authorization of CE, page the UE by using at least one of a resource in normal coverage or a resource of an authorized CE level.

The embodiments of the present disclosure further provide a computer storage medium storing computer programs which are configured to execute the method for selecting and accessing a network described above.

In an exemplary technical solution provided by the present disclosure, the base station broadcasts access parameter information, where the access parameter information is used for enabling the UE without authorization of coverage enhancement (CE) to determine whether the UE is able to use a network resource of a target cell. The MME determines whether the UE is authorized with CE, and sends a paging message to the base station on the basis of whether the UE is authorized with CE. The base station receives the paging message sent by the MME, and for a UE without authorization of CE, the base station pages the UE by using at least one of a resource in normal coverage or a resource of an authorized CE level. After the base station receives the CE authorization information reported by the UE or UE CE authorization information transmitted by the MME or the UE CE authorization information transmitted by another base station, the base station uses a resource other than the resource corresponding to unauthorized CE during resource configuration and scheduling. The described technical solution can mitigate, amongst other problems and drawbacks of existing systems, the problem in the existing CE authorization function of access restriction policy of the UE without authorization of CE and the transmission of related information.

BRIEF DESCRIPTION OF DRAWINGS

FIG. 1 is a flowchart of an example method for selecting and accessing a network, according to an embodiment of the present disclosure.

FIG. 2 is a flowchart of another example method for selecting and accessing a network, according to an embodiment of the present disclosure.

DETAILED DESCRIPTION

Figure 3:
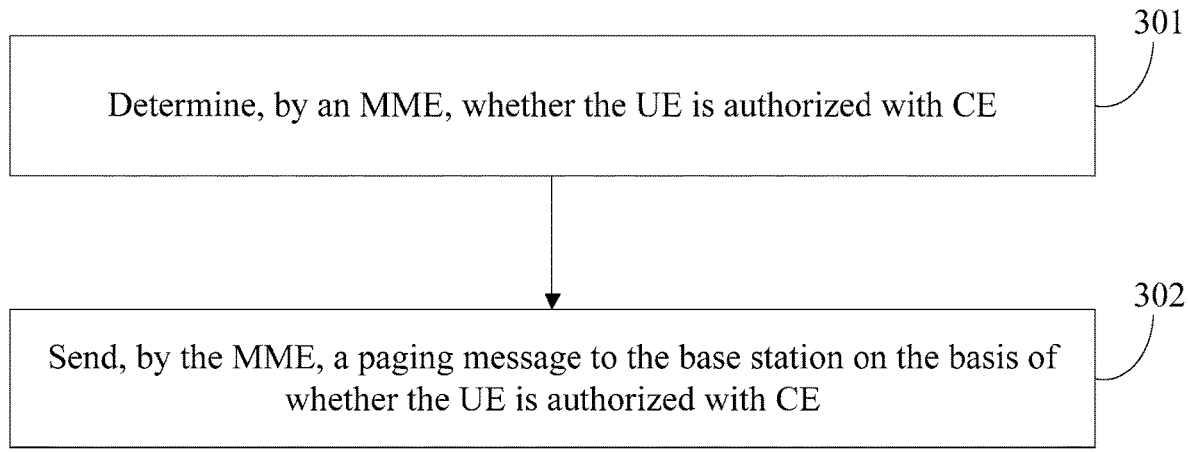
FIG. 3 is a flowchart of yet another example method for selecting and accessing a network, according to an embodiment of the present disclosure.

To provide a more detailed understanding of features of embodiments of the present disclosure, implementations of the embodiments of the present disclosure are described below in detail with reference to the drawings. The drawings are provided for reference only and are not intended to limit the embodiments of the present disclosure.

FIG. 1 is a flowchart of an example method for selecting and accessing a network according to an embodiment of the present disclosure. The method for selecting and accessing a network in this embodiment is applied to a base station side. As shown in FIG. 1, the method for selecting and accessing a network includes a step described below.

In step 101, a base station broadcasts access parameter information, where the access parameter information is used for enabling a user equipment (UE) without authorization of coverage enhancement (CE) to determine whether the UE is able to use a network resource of a target cell.

In this embodiment, the access parameter information includes at least one parameter of a group consisting of: a CE level reference signal received power (RSRP) threshold of a neighbor cell, a CE level RSRP threshold for cell selection, an offset of the CE level RSRP threshold of the cell relative to a minimum reception level threshold for decision of cell residence, a decision threshold of a CE mode, an offset of the decision threshold of the CE mode relative to the minimum reception level threshold for the decision of cell residence, a minimum reception level threshold of the cell without authorization of CE, and an offset of the minimum reception level threshold of the cell without authorization of CE relative to the minimum reception level threshold of the cell.

In this embodiment, the authorization of CE is an authorization of the overall CE in a case where the access parameter information includes at least one of: the CE level RSRP threshold corresponding to a CE level 0 of the neighbor cell, the CE level RSRP threshold corresponding to the CE level 0 for the cell selection, the offset of the CE level RSRP threshold corresponding to the CE level 0 relative to the minimum reception level threshold for the decision of cell residence, the minimum reception level threshold of the cell without authorization of CE, or the offset of the minimum reception level threshold of the cell without authorization of CE relative to the minimum reception level threshold of the cell.

The authorization of CE is an authorization of the CE level in a case where the access parameter information includes at least one of: a plurality of the CE level RSRP thresholds corresponding to respective CE levels of the neighbor cell, the CE level RSRP thresholds corresponding to the respective CE levels for the cell selection, or the offset of each CE level RSRP threshold of the cell relative to the minimum reception level threshold for the decision of cell residence.

The authorization of CE is an authorization of the CE mode in a case where the access parameter information includes at least one of: the decision threshold of the CE mode, or the offset of the decision threshold of the CE mode relative to the minimum reception level threshold for the decision of cell residence.

In this embodiment, the authorization of the overall CE means to only control whether the UE is able to use a resource of coverage enhancements (CEs);

the authorization of the CE level means to control whether the UE is able to use a resource corresponding to a designated CE level; and the authorization of the CE mode means to control whether the UE is able to use the resource corresponding to a designated CE mode.

FIG. 2 is a flowchart of a another example method for selecting and accessing a network according to an embodiment of the present disclosure. The method for selecting and accessing a network in this embodiment is applied to a UE side. As shown in FIG. 2, the method for selecting and accessing a network includes a step described below.

In step 201, the UE receives access parameter information, where the access parameter information is used for enabling the UE to determine, when being without authorization of CE, whether the UE is able to use the network resource of the target cell.

In this embodiment, the step where the UE without authorization of CE determines whether the UE is able to use the network resource of the target cell is performed in any one of following processes: cell selection, cell reselection, and a physical random access channel (PRACH) initiated by the UE.

In this embodiment, the access parameter information includes at least one parameter of a group consisting of: a CE level reference signal received power (RSRP) threshold of a neighbor cell, a CE level RSRP threshold for cell selection, an offset of the CE level RSRP threshold of the cell relative to a minimum reception level threshold for decision of cell residence, a decision threshold of a CE mode, an offset of the decision threshold of the CE mode relative to the minimum reception level threshold for the decision of cell residence, a minimum reception level threshold of the cell without authorization of CE, and an offset of the minimum reception level threshold of the cell without authorization of CE relative to the minimum reception level threshold of the cell.

In this embodiment, the authorization of CE is an authorization of the overall CE in a case where the access parameter information includes at least one of: the CE level RSRP threshold corresponding to a CE level 0 of the neighbor cell, the CE level RSRP threshold corresponding to the CE level 0 for the cell selection, the offset of the CE level RSRP threshold corresponding to the CE level 0 relative to the minimum reception level threshold for the decision of cell residence, the minimum reception level threshold of the cell without authorization of CE, or the offset of the minimum reception level threshold of the cell without authorization of CE relative to the minimum reception level threshold of the cell.

The authorization of CE is an authorization of the CE level in a case where the access parameter information includes at least one of: a plurality of the CE level RSRP thresholds corresponding to respective CE levels of the neighbor cell, the CE level RSRP thresholds corresponding to the respective CE levels for the cell selection, or the offset of each CE level RSRP threshold of the cell relative to the minimum reception level threshold for the decision of cell residence.

The authorization of CE is an authorization of the CE mode in a case where the access parameter information includes at least one of: the decision threshold of the CE mode, or the offset of the decision threshold of the CE mode relative to the minimum reception level threshold for the decision of cell residence.

In this embodiment, the authorization of the overall CE means to only control whether the UE is able to use a resource of coverage enhancements (CEs);

the authorization of the CE level means to control whether the UE is able to use a resource corresponding to a designated CE level; and the authorization of the CE mode means to control whether the UE is able to use the resource corresponding to a designated CE mode.

In this embodiment, in the process of cell selection, the UE without authorization of CE determines whether the UE is able to use the network resource of the target cell in one of following modes:

a cell with an unauthorized coverage level is considered to be not satisfy cell residence; and the cell with the unauthorized coverage level is considered to be in a barred state.

In this embodiment, in the process of cell reselection, the UE without authorization of CE determines whether the UE is able to use the network resource of the target cell in one of following modes:

a cell with an unauthorized coverage level is considered to be not satisfy cell residence;

the cell with the unauthorized coverage level is considered to be in a barred state; and the cell with the unauthorized coverage level is considered to have a lowest priority level in the cell reselection.

In this embodiment, in the process of initiating the PRACH, the UE without authorization of CE determines whether the UE is able to use the network resource of the target cell in one of following modes:

when a PRACH resource selected by the UE without authorization of CE in a resident cell is a PRACH resource of an unauthorized CE level, the UE does not initiate the PRACH process; and when an RSRP measurement value of the cell without authorization of CE resides is within a range unauthorized with CE, the UE does not initiate the PRACH process.

In this embodiment, the method further includes that the UE reports CE authorization information of the UE to the base station through one of following messages: an RRC connection request, an RRC connection resume request, and an RRC connection reestablishment request.

The CE authorization information of the UE indicates at least one of: whether the UE is able to use the network resource in CE, whether the UE is able to use the network resource of a designated CE level, or whether the UE is able to use the network resource of a designated CE mode.

FIG. 3 is a flowchart of yet another example method for selecting and accessing a network according to an embodiment of the present disclosure. The method for selecting and accessing a network in this embodiment is applied to an MME side. As shown in FIG. 3, the method for selecting and accessing a network includes steps described below.

In step 301, the MME determines whether a UE is authorized with CE.

In step 302, the MME sends a paging message to a base station on the basis of whether the UE is authorized with CE.

In this embodiment, the method further includes: when the MME sends the paging message of the UE to the base station:

in response to determining that the UE has authorization of CE, the paging message contains a CE level of the UE;

in response to determining that the UE has no authorization of CE, the paging message contains indication of no authorization of CE and does not contain the CE level of the UE; and in response to determining that the UE has authorization of part of all CE levels, the paging message contains one of: a CE level authorization indication, or the CE level authorization indication and the CE level of the UE.

In this embodiment, the method further includes: in a process of service establishment, modification or handover, transmitting, by the MME, CE authorization information of the UE to the base station through one message of a group consisting of:

an initial context establishment request, a UE context modification request, a UE radio capability match request, downlink NAS transport, a connection establishment indication, a UE context resume response, a handover command, and a handover request.

The CE authorization information of the UE indicates at least one of: whether the UE is able to use the network resource in CE, whether the UE is able to use the network resource of a designated CE level, or whether the UE is able to use the network resource of a designated CE mode.

Figure 4:
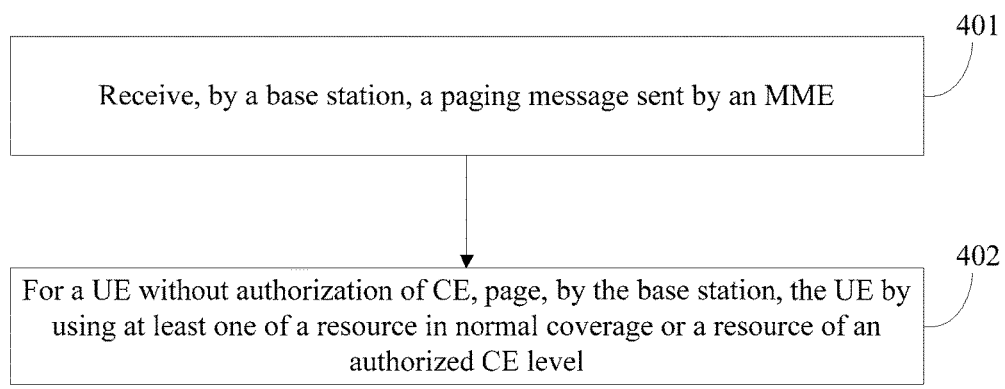
FIG. 4 is a flowchart of yet another example method for selecting and accessing a network, according to an embodiment of the present disclosure.

FIG. 4 is a flowchart of yet another example method for selecting and accessing a network according to an embodiment of the present disclosure. The method for selecting and accessing a network in this embodiment is applied to the base station side. As shown in FIG. 4, the method for selecting and accessing a network includes steps described below.

In step 401, a base station receives a paging message sent by an MME.

In step 402, for a user equipment (UE) without authorization of coverage enhancement (CE), the base station pages the UE by using at least one of a resource in normal coverage or a resource of an authorized CE level.

In this embodiment, the method further includes: in a case where the paging message received by the base station contains a CE level of the UE and does not contain a CE level authorization indication, paging, by the base station, the UE by using the resource corresponding to one of the CE level or a maximum CE level of the UE;

in a case where the paging message received by the base station contains indication of no authorization of CE, when the base station pages the UE, not resending a physical layer message for paging the UE;

in a case where the paging message received by the base station contains the CE level authorization indication, when the base station pages the UE, paging the UE by using the resource corresponding to an authorized maximum CE level; or in a case where the paging message received by the base station contains the CE level authorization indication and the CE level of the UE, when the base station pages the UE, paging the UE by using the resource corresponding to a lower level in the authorized maximum CE level and the CE level of the UE, or paging the UE by using the resource corresponding to the authorized maximum CE level.

In this embodiment, the method further includes: in response to determining that the base station is a source base station, in a process of a target base station acquiring UE context or handover, transmitting, by the source base station, CE authorization information of the UE to the target base station through one message of a group consisting of: a retrieve UE context response, and a handover request.

The CE authorization information of the UE indicates at least one of: whether the UE is able to use the network resource in CE, whether the UE is able to use the network resource of a designated CE level, or whether the UE is able to use the network resource of a designated CE mode.

In this embodiment, the method further includes: after the base station receives the CE authorization information reported by the UE or UE CE authorization information transmitted by the MME or the UE CE authorization information transmitted by another base station, using a resource other than the resource corresponding to unauthorized CE during resource configuration and scheduling.

The CE authorization information of the UE indicates at least one of: whether the UE is able to use the network resource in CE, whether the UE is able to use the network resource of a designated CE level, or whether the UE is able to use the network resource of a designated CE mode.

The method for selecting and accessing a network provided in the present disclosure will be detailed below in conjunction with specific application scenarios.

Figure 5:
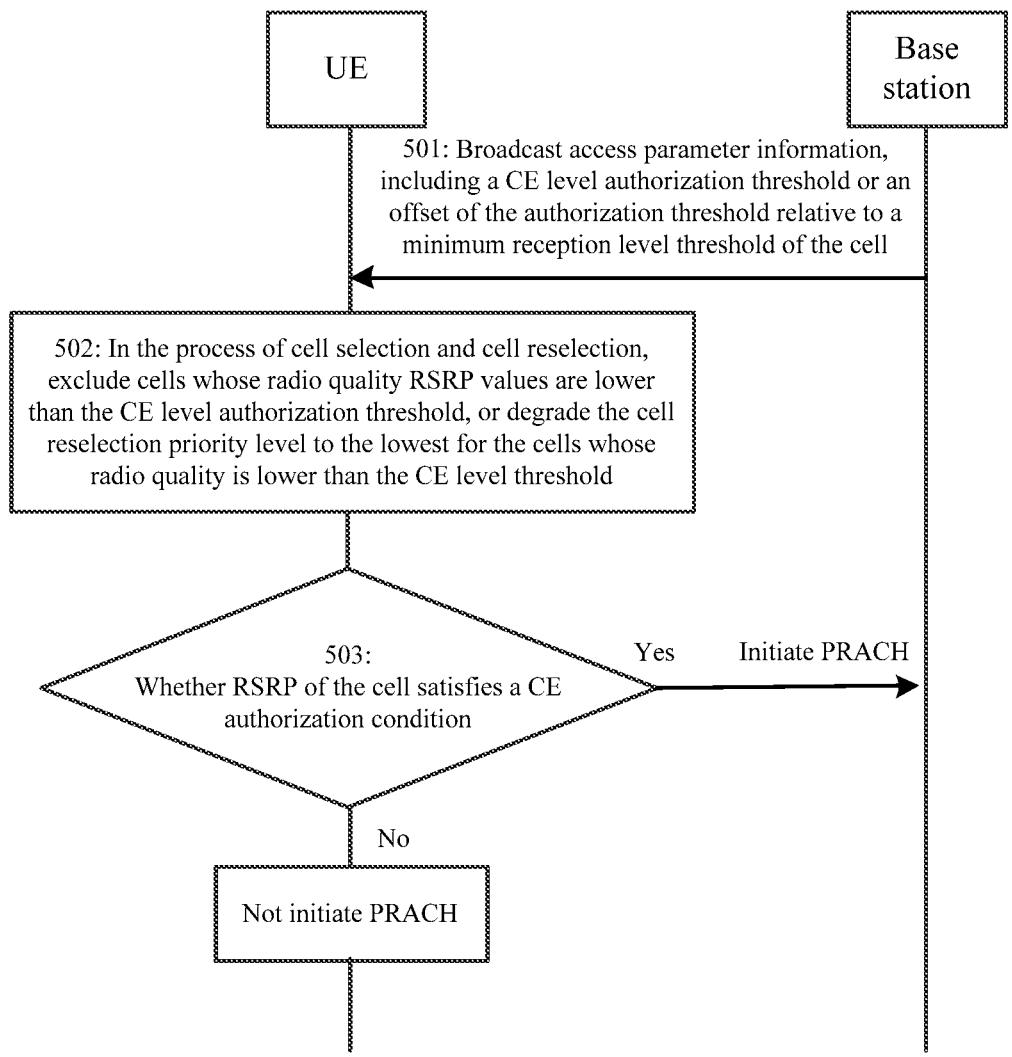
FIG. 5 is a flowchart of an example embodiment of a method for selecting and accessing a network, according to an embodiment of the present disclosure.

FIG. 5 is a flowchart of an example embodiment of a method for selecting and accessing a network based on coverage enhancement authorization according to an embodiment of the present disclosure. This embodiment shows how to limit the UE with authorization of CE to use a network resource in CE.

In step 501, an eNodeB broadcasts access parameter information to the UE, where the access parameter information includes a CE level authorization threshold or an offset of the authorization threshold relative to a minimum reception level threshold of the cell.

The CE level authorization threshold may specifically be: the CE level RSRP threshold of a neighbor cell, the CE level RSRP threshold for cell selection, the decision threshold of the CE mode and other similar thresholds.

The offset of the authorization threshold relative to a minimum reception level threshold of the cell may specifically be: the offset of the CE level RSRP threshold of the cell relative to a minimum reception level threshold for decision of cell residence, the offset of the decision threshold of the CE mode relative to the minimum reception level threshold for the decision of cell residence, and other similar offsets.

In step 502, in the process of cell selection and cell reselection, the UE excludes cells whose radio quality RSRP value is lower than the CE level authorization threshold, or degrade the cell reselection priority level to the lowest for the cells whose radio quality is lower than the CE level threshold.

In step 503, in the process of initiating the PRACH, the UE determines whether the UE is able to use a network resource of a target cell. If the UE is able to use the network resource of the target cell, the PRACH is initiated, while if the UE is able to use the network resource of the target cell, the PRACH is not initiated.

In the process of initiating the PRACH, the UE determines whether the UE is able to use the network resource of the target cell in one of following modes:

when a PRACH resource selected by the UE without authorization of CE in a resident cell is a PRACH resource of an unauthorized CE level, the UE does not initiate the PRACH process; and when an RSRP measurement value of the cell without authorization of CE resides is within a range unauthorized with CE, the UE does not initiate the PRACH process.

Figure 6:
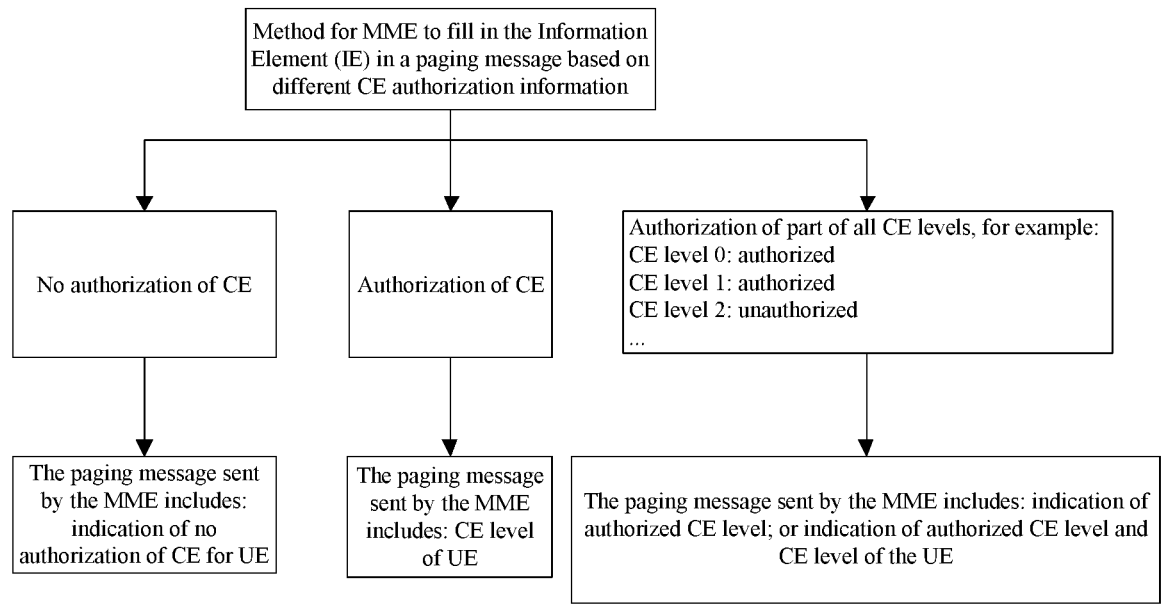
FIG. 6 is a flowchart of another example embodiment of a method for selecting and accessing a network according to an embodiment of the present disclosure.

FIG. 6 is a flowchart of another example embodiment of a method for selecting and accessing a network based on coverage enhancement authorization according to an embodiment of the present disclosure. This embodiment shows types of CE authorization and a method for MME to fill in the information element (IE) in a paging message corresponding to different CE authorization results.

As shown in FIG. 6, there are three types of CE authorization.

For the network resource when the UE has authorization of CE, the MME contains the CE level of the UE into the paging message; and the eNodeB, after receiving the paging message, pages the UE by using the resource corresponding to one of the CE level of the UE or the maximum CE level.

For the network resource when the UE has no authorization of CE, the MME contains indication of no authorization of CE into the paging message, does not contain the CE level of the UE into the paging message; and the eNodeB, when paging the UE after receiving the paging message, does not resend the physical layer message paging the UE.

For the resource when the UE has authorization of part of all CE levels, the MME contains any one of the followings: the CE level authorization indication, or the CE level authorization indication and the CE level of the UE into the paging message. If the paging message received by the eNodeB contains the CE level authorization indication, the eNodeB pages the UE by using the resource corresponding to authorized maximum CE level. If the paging message received by the eNodeB contains the CE level authorization indication and the CE level of the UE, the eNodeB pages the UE by using the resource corresponding to a smaller level of the authorized maximum CE level and the CE level of the UE, or pages the UE by using the resource corresponding to the authorized maximum CE level.

Figure 7:
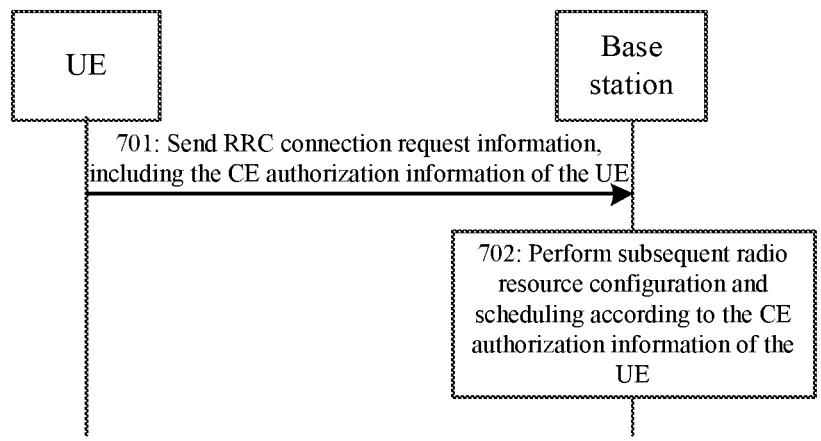
FIG. 7 is a flowchart of yet another example embodiment of a method for selecting and accessing a network according to an embodiment of the present disclosure.

FIG. 7 is a flowchart of yet another example embodiment of a method for selecting and accessing a network based on coverage enhancement authorization according to an embodiment of the present disclosure. This embodiment shows that the UE reports the CE authorization information of the UE to the eNodeB.

In step 701, the UE sends RRC connection request information including the CE authorization information of the UE. The RRC connection request information includes at least one of following messages:

an RRC connection request, an RRC connection resume request, and an RRC connection reestablishment request.

In step 702, the eNodeB, after receiving the CE authorization information of the UE, performs subsequent radio resource configuration and scheduling according to the CE authorization information of the UE: not to configure or schedule a resource in an authorized CE for the UE.

Figure 8:
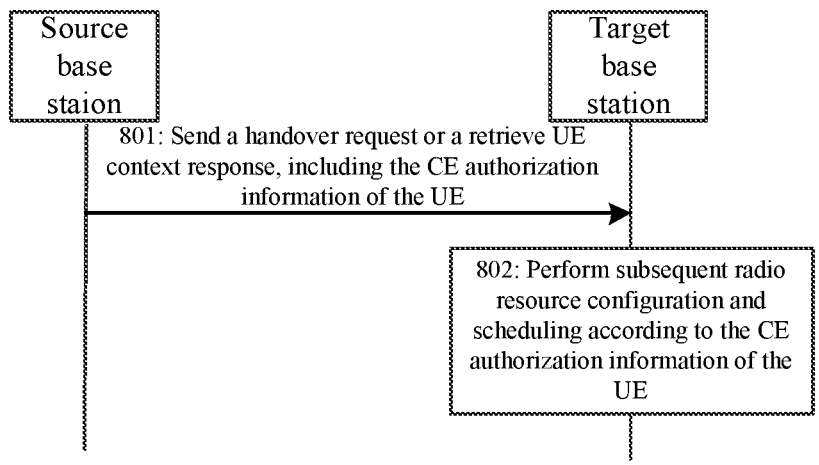
FIG. 8 is a flowchart of yet another example embodiment of a method for selecting and accessing a network.

FIG. 8 is a flowchart of yet another example embodiment of a method for selecting and accessing a network based on coverage enhancement authorization according to an embodiment of the present disclosure. This embodiment shows that a source eNodeB transmits the CE authorization information of the UE to a target eNodeB.

In step 801, the source eNodeB sends a handover request or a retrieve UE context response to the target eNodeB, and carries the CE authorization information of the UE.

In step 802, the target eNodeB, after receiving the CE authorization information of the UE, performs subsequent radio resource configuration and scheduling according to the CE authorization information of the UE: not configure or schedule a resource in an authorized CE for the UE.

Figure 9:
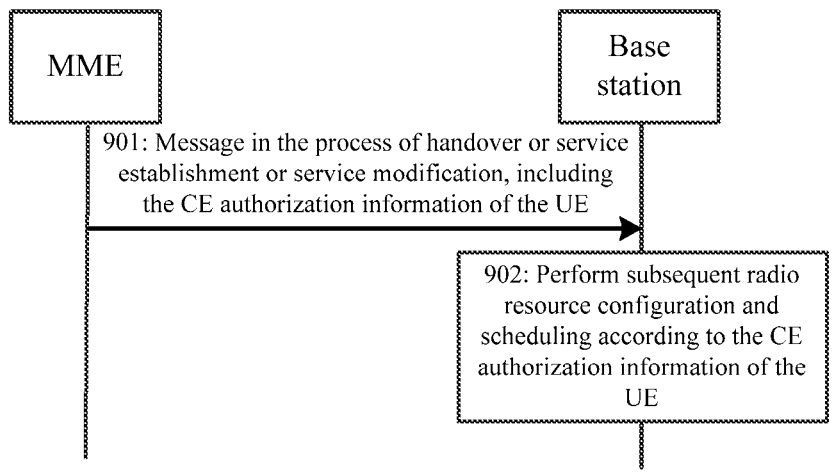
FIG. 9 is a flowchart of yet another example embodiment of a method for selecting and accessing a network.

FIG. 9 is a flowchart of yet another example embodiment of a method for selecting and accessing a network based on coverage enhancement authorization according to an embodiment of the present disclosure. This embodiment shows that the MME transmits the CE authorization information of the UE to the eNodeB.

In step 901, in the process of handover or service establishment or service modification, the MME sends a message to the eNodeB, where the message contains the CE authorization information of the UE.

The message, carrying the CE authorization information of the UE, sent by the MME to the eNodeB in the process of handover or service establishment or service modification includes at least one of:

an initial context establishment request, a UE context modification request, a UE radio capability match request, downlink NAS transport, a connection establishment indication, a UE context resume response, a handover command, and a handover request.

In step 902, the target eNodeB, after receiving the CE authorization information of the UE, performs subsequent radio resource configuration and scheduling according to the CE authorization information of the UE: not configure or schedule a resource in an authorized CE for the UE.

Figure 10:
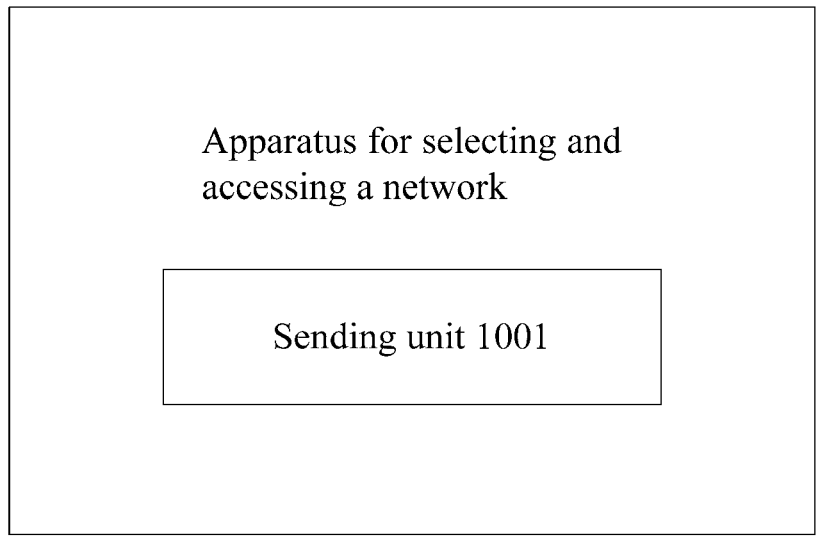
FIG. 10 is a block diagram of an example apparatus for selecting and accessing a network, according to an embodiment of the present disclosure.

FIG. 10 is a block diagram of an example apparatus for selecting and accessing a network according to an embodiment of the present disclosure. The apparatus is applied to the base station and, as shown in FIG. 10, includes a sending unit 1001.

The sending unit 1001 is configured to broadcast access parameter information, where the access parameter information is used for enabling a UE without authorization of CE to determine whether the UE is able to use a network resource of a target cell.

In this embodiment, the access parameter information includes at least one parameter of a group consisting of:

a CE level reference signal received power (RSRP) threshold of a neighbor cell, a CE level RSRP threshold for cell selection, an offset of the CE level RSRP threshold of the cell relative to a minimum reception level threshold for decision of cell residence, a decision threshold of a CE mode, an offset of the decision threshold of the CE mode relative to the minimum reception level threshold for the decision of cell residence, a minimum reception level threshold of the cell without authorization of CE, and an offset of the minimum reception level threshold of the cell without authorization of CE relative to the minimum reception level threshold of the cell.

In this embodiment, the authorization of CE is an authorization of the overall CE in a case where the access parameter information includes at least one of: the CE level RSRP threshold corresponding to a CE level 0 of the neighbor cell, the CE level RSRP threshold corresponding to the CE level 0 for the cell selection, the offset of the CE level RSRP threshold corresponding to the CE level 0 relative to the minimum reception level threshold for the decision of cell residence, the minimum reception level threshold of the cell without authorization of CE, or the offset of the minimum reception level threshold of the cell without authorization of CE relative to the minimum reception level threshold of the cell.

The authorization of CE is an authorization of the CE level in a case where the access parameter information includes at least one of: a plurality of the CE level RSRP thresholds corresponding to respective CE levels of the neighbor cell, the CE level RSRP thresholds corresponding to the respective CE levels for the cell selection, or the offset of each CE level RSRP threshold of the cell relative to the minimum reception level threshold for the decision of cell residence.

The authorization of CE is an authorization of the CE mode in a case where the access parameter information includes at least one of: the decision threshold of the CE mode, or the offset of the decision threshold of the CE mode relative to the minimum reception level threshold for the decision of cell residence.

In this embodiment, the authorization of the overall CE means to only control whether the UE is able to use a resource of coverage enhancements (CEs);

the authorization of the CE level means to control whether the UE is able to use a resource corresponding to a designated CE level; and the authorization of the CE mode means to control whether the UE is able to use the resource corresponding to a designated CE mode.

It is to be understood by those skilled in the art that implementing functions of various units of the apparatus for selecting and accessing a network shown in FIG. 10 may be understood with reference to the description of the foregoing method for selecting and accessing a network. The functions of the various units of the apparatus for selecting and accessing a network shown in FIG. 10 may be implemented by one or more programs running on a processor or by one or more specific logic circuits.

In practical applications, functions implemented by various units of the apparatus for selecting and accessing a network may all be implemented by a central processing unit (CPU), or a micro-processor unit (MPU), or a digital signal processor (DSP), or a field programmable gate array (FPGA) or the like located in the apparatus for selecting and accessing a network.

Figure 11:
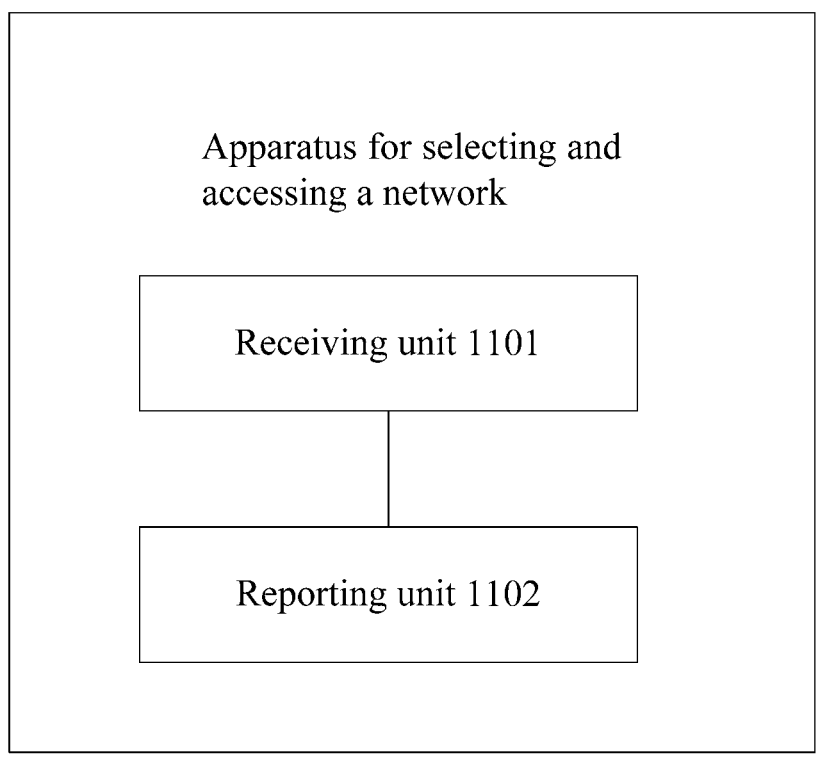
FIG. 11 is a block diagram of another example apparatus for selecting and accessing a network, according to an embodiment of the present disclosure.

FIG. 11 is a block diagram of another example apparatus for selecting and accessing a network according to an embodiment of the present disclosure. The apparatus is applied to the UE and, as shown in FIG. 11, includes a receiving unit 1101.

The receiving unit 1101 is configured to receive access parameter information, where the access parameter information is used for enabling the UE to determine, when being without authorization of CE, whether the UE is able to use a network resource of a target cell.

In this embodiment, the step where the UE without authorization of CE determines whether the UE is able to use the network resource of the target cell is performed in any one of following processes: cell selection, cell reselection, and a PRACH initiated by the UE.

In this embodiment, the access parameter information includes at least one parameter of a group consisting of:

a CE level reference signal received power (RSRP) threshold of a neighbor cell, a CE level RSRP threshold for cell selection, an offset of the CE level RSRP threshold of the cell relative to a minimum reception level threshold for decision of cell residence, a decision threshold of a CE mode, an offset of the decision threshold of the CE mode relative to the minimum reception level threshold for the decision of cell residence, a minimum reception level threshold of the cell without authorization of CE, and an offset of the minimum reception level threshold of the cell without authorization of CE relative to the minimum reception level threshold of the cell.

In this embodiment, the authorization of CE is an authorization of the overall CE in a case where the access parameter information includes at least one of: the CE level RSRP threshold corresponding to a CE level 0 of the neighbor cell, the CE level RSRP threshold corresponding to the CE level 0 for the cell selection, the offset of the CE level RSRP threshold corresponding to the CE level 0 relative to the minimum reception level threshold for the decision of cell residence, the minimum reception level threshold of the cell without authorization of CE, or the offset of the minimum reception level threshold of the cell without authorization of CE relative to the minimum reception level threshold of the cell.

The authorization of CE is an authorization of the CE level in a case where the access parameter information includes at least one of: a plurality of the CE level RSRP thresholds corresponding to respective CE levels of the neighbor cell, the CE level RSRP thresholds corresponding to the respective CE levels for the cell selection, or the offset of each CE level RSRP threshold of the cell relative to the minimum reception level threshold for the decision of cell residence.

The authorization of CE is an authorization of the CE mode in a case where the access parameter information includes at least one of: the decision threshold of the CE mode, or the offset of the decision threshold of the CE mode relative to the minimum reception level threshold for the decision of cell residence.

In this embodiment, the authorization of the overall CE means to only control whether the UE is able to use a resource of coverage enhancements (CEs);

the authorization of the CE level means to control whether the UE is able to use a resource corresponding to a designated CE level; and the authorization of the CE mode means to control whether the UE is able to use the resource corresponding to a designated CE mode.

In this embodiment, in the process of cell selection, the UE without authorization of CE determines whether the UE is able to use the network resource of the target cell in one of following modes:

a cell with an unauthorized coverage level is considered to be not satisfy cell residence; and the cell with the unauthorized coverage level is considered to be in a barred state.

In this embodiment, in the process of cell reselection, the UE without authorization of CE determines whether the UE is able to use the network resource of the target cell in one of following modes:

a cell with an unauthorized coverage level is considered to be not satisfy cell residence;

the cell with the unauthorized coverage level is considered to be in a barred state; and the cell with the unauthorized coverage level is considered to have a lowest priority level in the cell reselection.

In this embodiment, in the process of initiating the PRACH, the UE without authorization of CE determines whether the UE is able to use the network resource of the target cell in one of following modes:

when a PRACH resource selected by the UE without authorization of CE in a resident cell is a PRACH resource of an unauthorized CE level, the UE does not initiate the PRACH process; and when an RSRP measurement value of the cell without authorization of CE resides is within a range unauthorized with CE, the UE does not initiate the PRACH process.

In this embodiment, the apparatus further includes: a reporting unit 1102. The reporting unit 1102 is configured to report CE authorization information of the UE to the base station through one of following messages: an RRC connection request, an RRC connection resume request, and an RRC connection reestablishment request.

The CE authorization information of the UE indicates at least one of: whether the UE is able to use the network resource in CE, whether the UE is able to use the network resource of a designated CE level, or whether the UE is able to use the network resource of a designated CE mode.

It is to be understood by those skilled in the art that implementing functions of various units of the apparatus for selecting and accessing a network shown in FIG. 11 may be understood with reference to the description of the foregoing method for selecting and accessing a network. The functions of the various units of the apparatus for selecting and accessing a network shown in FIG. 11 may be implemented by one or more programs running on a processor or by one or more specific logic circuits.

In practical applications, the functions implemented by various units of the apparatus for selecting and accessing a network may all be implemented by a CPU, or an MPU, or a DSP, or an FPGA or the like located in the apparatus for selecting and accessing a network.

Figure 12:
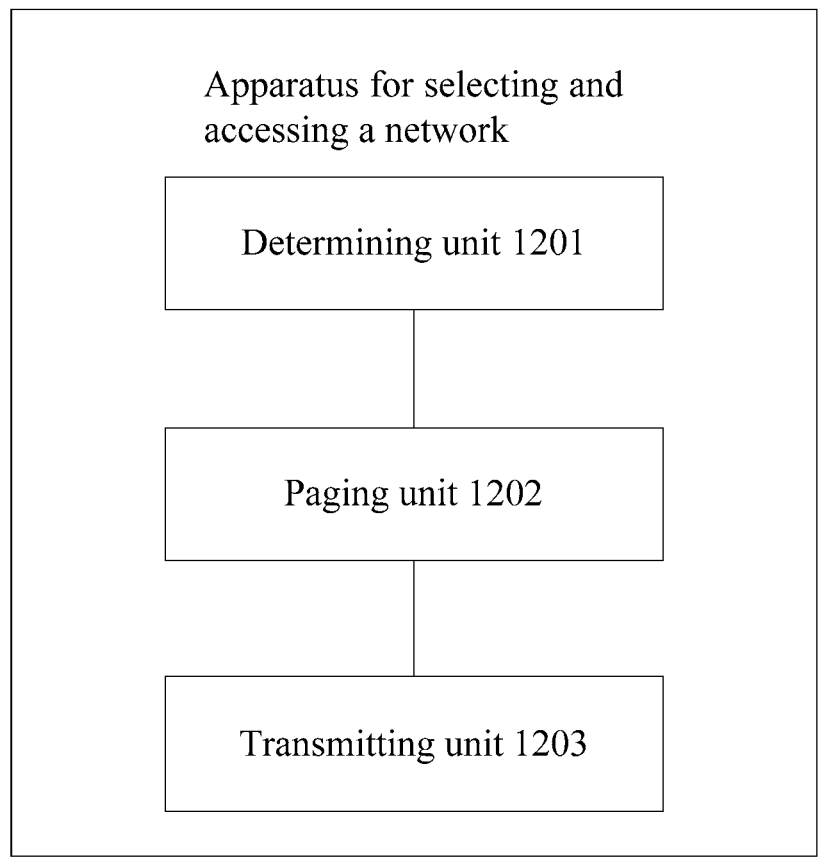
FIG. 12 is a block diagram of yet another example apparatus for selecting and accessing a network, according to an embodiment of the present disclosure.

FIG. 12 is a block diagram of yet another example apparatus for selecting and accessing a network according to an embodiment of the present disclosure. The apparatus is applied to the MME and, as shown in FIG. 12, includes a determining unit 1201 and a paging unit 1202.

The determining unit 1201 is configured to determine whether a UE is authorized with CE.

The paging unit 1202 is configured to send a paging message to the base station on the basis of whether the UE is authorized with CE.

In this embodiment, the paging unit 1202 is specifically configured to: when the MME sends the paging message of the UE to the base station:

in response to determining that the UE has authorization of CE, contain a CE level of the UE into the paging message;

in response to determining that the UE has no authorization of CE, contain indication of no authorization of CE into the paging message and not contain the CE level of the UE into the paging message; and in response to determining that the UE has authorization of part of all CE levels, contain one of: a CE level authorization indication, or the CE level authorization indication and the CE level of the UE into the paging message.

In this embodiment, the apparatus further includes: a transmitting unit 1203. The transmitting unit 1203 is configured to, in a process of service establishment, modification or handover, transmit CE authorization information of the UE to the base station through one message of a group consisting of: an initial context establishment request, a UE context modification request, a UE radio capability match request, downlink NAS transport, a connection establishment indication, a UE context resume response, a handover command, and a handover request.

The CE authorization information of the UE indicates at least one of: whether the UE is able to use the network resource in CE, whether the UE is able to use the network resource of a designated CE level, or whether the UE is able to use the network resource of a designated CE mode.

It is to be understood by those skilled in the art that implementing functions of various units of the apparatus for selecting and accessing a network shown in FIG. 12 may be understood with reference to the description of the foregoing method for selecting and accessing a network. The functions of the various units of the apparatus for selecting and accessing a network shown in FIG. 12 may be implemented by one or more programs running on a processor or by one or more specific logic circuits.

In practical applications, the functions implemented by various units of the apparatus for selecting and accessing a network may all be implemented by a CPU, or an MPU, or a DSP, or an FPGA or the like located in the apparatus for selecting and accessing a network.

Figure 13:
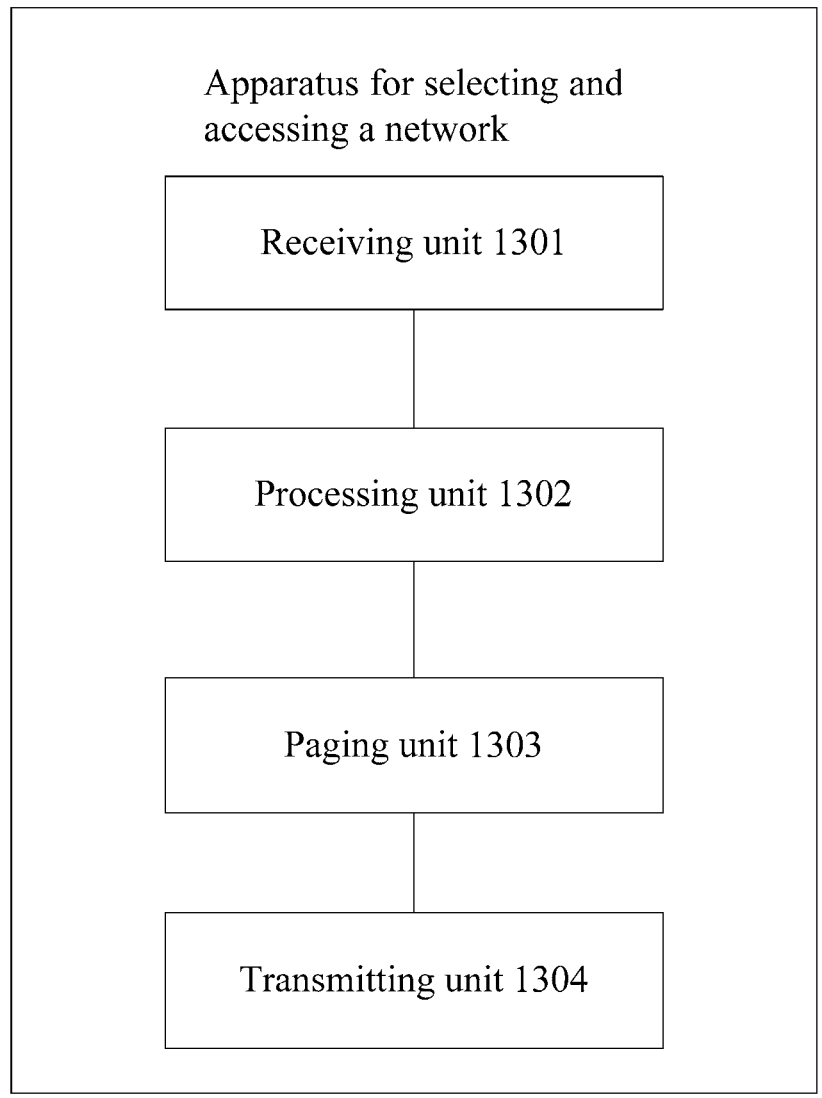
FIG. 13 is a block diagram of yet another example apparatus for selecting and accessing a network, according to an embodiment of the present disclosure.

FIG. 13 is a block diagram of yet another example apparatus for selecting and accessing a network according to an embodiment of the present disclosure. The apparatus is applied to the base station and, as shown in FIG. 13, includes a receiving unit 1301 and a processing unit 1302.

The receiving unit 1301 is configured to receive a paging message sent by the MME.

The processing unit 1302 is configured to, for a UE without authorization of CE, page the UE by using at least one of a resource in normal coverage or a resource of an authorized CE level.

In this embodiment, the apparatus further includes a paging unit 1303. The paging unit 1303 is configured to, in a case where the paging message received by the base station contains a CE level of the UE, page, by the base station, the UE by using the resource corresponding to one of the CE level or a maximum CE level of the UE;

in a case where the paging message received by the base station contains indication of no authorization of CE, when the base station pages the UE, not resend a physical layer message for paging the UE;

in a case where the paging message received by the base station contains the CE level authorization indication, when the base station pages the UE, page the UE by using the resource corresponding to an authorized maximum CE level; or in a case where the paging message received by the base station contains the CE level authorization indication and the CE level of the UE, when the base station pages the UE, page the UE by using the resource corresponding to a lower level in the authorized maximum CE level and the CE level of the UE, or page the UE by using the resource corresponding to the authorized maximum CE level.

In this embodiment, the apparatus further includes: a transmitting unit 1304. The transmitting unit 1304 is configured to, in response to determining that the base station is a source base station, in a process of a target base station acquiring UE context or handover, transmit CE authorization information of the UE to the target base station through one message of a group consisting of: a retrieve UE context response, and a handover request.

The CE authorization information of the UE indicates at least one of: whether the UE is able to use the network resource in CE, whether the UE is able to use the network resource of a designated CE level, or whether the UE is able to use the network resource of a designated CE mode.

In this embodiment, the processing unit 1302 is further configured to, after the base station receives the CE authorization information reported by the UE or UE CE authorization information transmitted by the MME or the UE CE authorization information transmitted by another base station, use a resource other than the resource corresponding to unauthorized CE during resource configuration and scheduling.

The CE authorization information of the UE indicates at least one of: whether the UE is able to use the network resource in CE, whether the UE is able to use the network resource of a designated CE level, or whether the UE is able to use the network resource of a designated CE mode.

It is to be understood by those skilled in the art that implementing functions of various units of the apparatus for selecting and accessing a network shown in FIG. 13 may be understood with reference to the description of the foregoing method for selecting and accessing a network. The functions of the various units of the apparatus for selecting and accessing a network shown in FIG. 13 may be implemented by one or more programs running on a processor or by one or more specific logic circuits.

In practical applications, the functions implemented by various units of the apparatus for selecting and accessing a network may all be implemented by a CPU, or an MPU, or a DSP, or an FPGA or the like located in the apparatus for selecting and accessing a network.

It should be understood by those skilled in the art that the embodiments of the present disclosure may be provided as methods, systems or computer program products. Therefore, the present disclosure may adopt a mode of a hardware embodiment, a software embodiment, or a combination of hardware and software embodiment. In addition, the present disclosure may adopt a form of a computer program product implemented on one or more computer-usable storage mediums (including, but not limited to, a disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or a processor of another programmable data processing device produce an apparatus for implementing functions designated in one or more flows in the flowcharts and/or one or more blocks in the block diagrams.

These computer program instructions may also be stored in a computer-readable memory which can direct a computer or another programmable data processing device to operate in a particular manner so that the instructions stored in the computer-readable memory produce a manufactured product including an instructing apparatus. The instructing apparatus implements the functions designated in one or more flows in the flowcharts and/or one or more blocks in the block diagrams.

These computer program instructions may also be loaded onto a computer or another programmable data processing device so that a series of operations and steps are performed on the computer or another programmable device to produce processing implemented by the computer. Therefore, instructions executed on the computer or another programmable device provide steps for implementing the functions designated in one or more flows in the flowcharts and/or one or more blocks in the block diagrams.

Accordingly, the embodiment of the present disclosure further provide a computer storage medium which stores computer instructions configured to execute the method for selecting and accessing a network provided in the embodiments of the present disclosure.

The above are only preferred embodiments of the present disclosure and are not intended to limit the scope of the present disclosure.

INDUSTRIAL APPLICABILITY

In the technical solution of the present disclosure, the base station broadcasts access parameter information, where the access parameter information is used for enabling the UE without authorization of coverage enhancement (CE) to determine whether the UE is able to use a network resource of a target cell. The MME determines whether the UE is authorized with CE, and sends a paging message to the base station on the basis of whether the UE is authorized with CE. The base station receives the paging message sent by the MME, and for a UE without authorization of CE, the base station pages the UE by using at least one of a resource in normal coverage or a resource of an authorized CE level. After the base station receives CE authorization information reported by the UE or CE authorization information of the UE transmitted by the MME or the CE authorization information of the UE transmitted by another base station, the base station uses a resource other than the resource corresponding to unauthorized CE during resource configuration and scheduling. The technical solution of the embodiments of the present disclosure can solve the problem in the existing CE authorization function of access restriction policy of the UE without authorization of CE and the transmission of related information.

What is claimed is:

1. A method for selecting and accessing a network, comprising:

broadcasting, by a base station, access parameter information, wherein the access parameter information comprises an offset of a coverage enhancement (CE) level reference signal received power (RSRP) threshold of a cell relative to a minimum reception level threshold for decision of cell residence, and is used for enabling a user equipment (UE) without authorization of CE to determine whether the UE is configured to use a network resource of a target cell, and wherein the UE is configured to:
in response to a radio quality RSRP value of the cell being lower than the CE level RSRP threshold of the cell, perform a step of excluding the cell or degrading a cell selection priority level of the cell to a lowest level, and make a determination to initiate a physical random access channel (PRACH) based on whether the UE is configured to use the network resource of the target cell.

2. The method of claim 1, wherein the access parameter information further comprises an offset of the minimum reception level threshold of the cell without authorization of CE relative to the minimum reception level threshold of the cell.

3. The method of claim 1, wherein the authorization of CE is an authorization of the overall CE in a case where the access parameter information comprises the offset of the CE level RSRP threshold corresponding to the CE level 0 relative to the minimum reception level threshold for the decision of cell residence.

4. The method of claim 3, wherein the authorization of the overall CE comprises controlling whether the UE is configured to use a resource of CE.

5. The method of claim 1, wherein the authorization of CE is an authorization of the overall CE in a case where the access parameter information comprises the offset of the minimum reception level threshold of the cell without authorization of CE relative to the minimum reception level threshold of the cell.

6. The method of claim 1, wherein the UE being configured to use the network resource of the target cell is during a cell selection process.

7. The method of claim 1, wherein the UE being configured to use the network resource of the target cell is during a cell reselection process.

8. A method for selecting and accessing a network, comprising:
receiving, by a user equipment (UE), access parameter information comprising an offset of a coverage enhancement (CE) level reference signal received power (RSRP) threshold of a cell relative to a minimum reception level threshold for decision of cell residence;
performing a step of:
excluding the cell or degrading a cell selection priority level of the cell to a lowest level in response to a radio quality RSRP value of the cell being lower than the CE level RSRP threshold of the cell, and
making a determination to initiate a physical random access channel (PRACH) based on whether the UE is configured to use a network resource of a target cell,
wherein the UE is configured to determine, when being without authorization of CE and based on the access parameter information, whether the UE is configured to use the network resource of the target target cell.

9. The method of claim 8, wherein the UE determines whether the UE is configured to use the network resource of the target cell during a cell selection process.

10. The method of claim 8, wherein the UE determines whether the UE is configured to use the network resource of the target cell during a cell reselection process.

11. The method of claim 8, wherein the access parameter information further comprises an offset of the minimum reception level threshold of the cell without authorization of CE relative to the minimum reception level threshold of the cell.

12. The method of claim 8, wherein the authorization of CE is an authorization of the overall CE in a case where the access parameter information comprises the offset of the CE level RSRP threshold corresponding to the CE level 0 relative to the minimum reception level threshold for the decision of cell residence.

13. The method of claim 12, wherein the authorization of the overall CE comprises controlling whether the UE is configured to use a resource of coverage enhancements (CEs).

14. The method of claim 8, wherein the authorization of CE is an authorization of the overall CE in a case where the access parameter information comprises the offset of the minimum reception level threshold of the cell without authorization of CE relative to the minimum reception level threshold of the cell.

15. An apparatus for selecting and accessing a network, comprising:
a processor; and
a memory with instructions thereon, wherein the instructions upon execution by the processor cause the processor to:
broadcast, by a base station, access parameter information, wherein the access parameter information comprises an offset of a coverage enhancement (CE) level reference signal received power (RSRP) threshold of a cell relative to a minimum reception level threshold for decision of cell residence, and is used for enabling a user equipment (UE) without authorization of CE to determine whether the UE is configured to use a network resource of a target cell, and
wherein the UE is configured to:
in response to a radio quality RSRP value of the cell being lower than the CE level RSRP threshold of the cell, perform a step of exclude the cell or degrade a cell selection priority level of the cell to a lowest level, and
make a determination to initiate a physical random access channel (PRACH) based on whether the UE is configured to use the network resource of the target cell.

16. The apparatus of claim 15, wherein the access parameter information further comprises an offset of the minimum reception level threshold of the cell without authorization of CE relative to the minimum reception level threshold of the cell.

17. The apparatus of claim 15, wherein the authorization of CE is an authorization of the overall CE in a case where the access parameter information comprises the offset of the CE level RSRP threshold corresponding to the CE level 0 relative to the minimum reception level threshold for the decision of cell residence.

18. The apparatus of claim 16, wherein the authorization of the overall CE comprises controlling whether the UE is configured to use a resource of CE.

19. The apparatus of claim 15, wherein the authorization of CE is an authorization of the overall CE in a case where the access parameter information comprises the offset of the minimum reception level threshold of the cell without authorization of CE relative to the minimum reception level threshold of the cell.

20. An apparatus for selecting and accessing a network, comprising:
a processor; and
a memory with instructions thereon, wherein the instructions upon execution by the processor cause the processor to:
receive, by a user equipment (UE), access parameter information comprising an offset of a coverage enhancement (CE) level reference signal received power (RSRP) threshold of a cell relative to a minimum reception level threshold for decision of cell residence;

perform a step of:

exclude the cell or degrade a cell selection priority level of the cell to a lowest level in response to a radio quality RSRP value of the cell being lower than the CE level RSRP threshold of the cell, and make a determination to initiate a physical random access channel (PRACH) based on whether the UE is configured to use a network resource of a target cell, wherein the UE is configured to determine, when being without authorization of CE and based on the access parameter information, whether the UE is configured to use the network resource of the target cell.

21. The apparatus of claim 20, wherein the access parameter information further comprises an offset of the minimum reception level threshold of the cell without authorization of CE relative to the minimum reception level threshold of the cell.

\* \* \* \* \*

UNITED STATES PATENT AND TRADEMARK OFFICE
CERTIFICATE OF CORRECTION

PATENT NO. : 11,172,376 B2
APPLICATION NO. : 16/403494
DATED : November 9, 2021
INVENTOR(S) : Sha et al.

It is certified that error appears in the above-identified patent and that said Letters Patent is hereby corrected as shown below:

In the Drawings

In Fig. 8, Sheet 5 of 8, Line 3, delete "staion" and insert -- station --, therefor.

In the Specification

In Column 1, Line 19, delete "a methods" and insert -- methods --, therefor.

In Column 4, Line 24, delete "disclosure;" and insert -- disclosure. --, therefor.

In Column 4, Line 27, delete "disclosure;" and insert -- disclosure. --, therefor.

In Column 9, Line 55, delete "followings:" and insert -- following: --, therefor.

In the Claims

In Column 17, Line 56, in Claim 8, delete "target target" and insert -- target --, therefor.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*